United States Patent
Roder et al.

[11] 3,825,371
[45] July 23, 1974

[54] FASTENING OF EROSION PROTECTIVE STRIPS TO AIRCRAFT PROFILES

[75] Inventors: Wolfgang Roder, Pinneberg; Wolfgang Volkner, Rellingen; Dieter Rusch, Holstein, all of Germany

[73] Assignee: Licentia Patent-Verwaltungs-G.m.b.H., Frankfurt am Main, Germany

[22] Filed: Oct. 27, 1972

[21] Appl. No.: 301,678

[30] Foreign Application Priority Data
Oct. 27, 1971  Germany............................ 2153434

[52] U.S. Cl................. 416/224, 416/241, 244/134
[51] Int. Cl............................................. B64c 11/20
[58] Field of Search.................. 416/224, 241, 24 A; 244/123, 134 A, 134 D, 134 R

[56] References Cited
UNITED STATES PATENTS

| | | | |
|---|---|---|---|
| 2,567,804 | 9/1951 | Davies | 244/134 A X |
| 3,144,349 | 8/1964 | Swingler et al. | 416/241 X |
| 3,178,560 | 4/1965 | Mapp et al. | 244/134 D X |
| 3,397,302 | 8/1968 | Hosford | 244/134 D X |

FOREIGN PATENTS OR APPLICATIONS

| | | | |
|---|---|---|---|
| 1,110,217 | 4/1968 | Great Britain | 244/134 D |

*Primary Examiner*—Everette A. Powell, Jr.
*Attorney, Agent, or Firm*—Spencer & Kaye

[57] ABSTRACT

An elastic adhesive, which is hydrophobic, possesses a high breaking strength, a low modulus of elasticity, a high resistance to peeling and shear and good vibration characteristics is used to fasten protective strips to the profiled portions of an aircraft.

10 Claims, 1 Drawing Figure

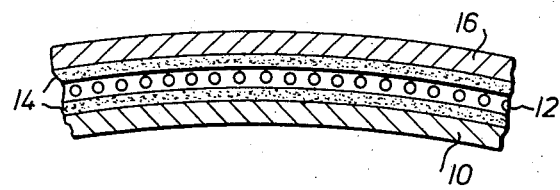

FASTENING OF EROSION PROTECTIVE STRIPS TO AIRCRAFT PROFILES

BACKGROUND OF THE INVENTION

The present invention relates to the fastening of protective strips or the like to the profiled portions of the aircraft and particularly to the fastening of erosion protective strips by means of an adhesive to helicopter rotor blades.

It is known, for example, to protect the leading edges of aircraft profiles against the effects of erosion caused for example, by raindrops, sand, rocks, ice or the like, by the application of special erosion protective strips made, for example, of nickel, titanium or other erosion resistant materials. These protective strips are of particular importance when the exposed profiled portions themselves are not made of an erosion resistant material but rather, for example, of plastic, or when heating mats including electrical heating resistors are attached at or near the leading edge of the profiled portions for the purpose of deicing. The heating mats are electrically insulated from the structure of the aircraft which is made of metal for example, by the application of an insulating layer, and are then covered with a second insulating layer which, however, would be directly subjected to the attack of erosion causing elements if it were not protected by the special erosion protective strip.

One possibility for fastening these erosion protective strips to the profiled portions is to partially attach them to the metal structure of the profiled portions, that is to partially integrate them into the metal structure of the profiled portion. Although this results in a good attachment and in a safe means of erosion protection, it is very expensive and cannot always be realized. A further drawback is that it is very difficult if not impossible to exchange erosion protective strips mounted in this manner.

Another and simpler possibility for fastening these erosion protective strips is to attach them to the profiled portions to be protected by means of an adhesive. Since it is a general rule in aircraft design to use high strength materials, the bonding adhesive used for this purpose is one which has a high strength, i.e. a relatively high modulus of elasticity. Accompanying the high modulus, however, was a low breaking strain capacity, that is, a break occurs after a relatively small elongation of the adhesive.

Additionally, since good temperature stability is necessary it must be assured that no significant changes occur in the strength characteristics of the adhesive over the operating temperature range of interest, e.g. −60°C to +150°C. Examples of such adhesives are the often used epoxy resins.

Test flights have shown, however, that when erosion protective strips for the protection of electrical heating mats were attached to the rotor blades of helicopters by means of such epoxy resins, these epoxy resins could not withstand the resulting stresses developed so that the protective strips would begin to separate from the rotor blades after several hours of operation.

Moreover, when the erosion protective strips are loosened and detached from their profiled portion, a rotor imbalance results. This produces an extremely dangerous flying situation which must be avoided.

Applicants have found that these malfunctions originate due to the fact that the epoxy resin adhesives employed are unable, due to their low elasticity — they usually have only a very low strain capacity — to absorb the material stresses developed between the rotor blade and the erosion protective strip. Considerable material stresses are developed in helicopter rotor blades due to the bending and torsional vibrations to which the rotor blades are subjected. Due to the different configurations of the material and geometric design of the rotor blades on the one hand and the erosion protective strips fastened thereto on the other hand, the stresses produce different deformations of the rotor blades. If, however, the adhesive disposed between the rotor blade and the protective strips cannot absorb the different stresses caused by the different degrees of deformation because of its own low elasticity, at least local destruction of the adhesive bond and separation of the erosion protective strips will result. Once the adhesive bond has been broken, even though locally, peeling will be initiated and will easily produce complete separation of the strips from the rotor blades, particularly since the epoxy resins employed are not particularly resistant to peeling.

SUMMARY OF THE INVENTION

It is, therefore, an object of the present invention to provide an improved way of attaching erosion protective strips or the like to the profiled portions of an aircraft, and particularly to the rotor blades of a helicopter, which avoids the above-described danger of destruction due to bending and torsional vibrations developed during operation of the aircraft.

It is another object of the present invention to provide an adhesive for attaching erosion protective strips or the like to the profiled portions of an aircraft easily and inexpensively.

These as well as other objects are accomplished according to the present invention by the provision of an elastic adhesive which has a high breaking strain, that is, a break occurs after a relatively large elongation of the adhesive. A low modulus of elasticity, a high resistance to peeling, good damping and does not absorb water, that is, it is hydrophobic.

Preferably the adhesive according to the present invention is a silicone adhesive.

BRIEF DESCRIPTION OF THE DRAWING

The drawing schematically illustrates a cross section a portion of a typical airfoil to which a heating mat and a protective strip are bonded with an elastic adhesive according to the invention.

DESCRIPTION OF THE PREFERRED EMBODIMENTS

According to the present invention, an elastic adhesive with a high breaking strain is used instead of the previously used epoxy resins. With this adhesive the stresses resulting from the different rotor blade or wing deformations which occur between the rotor blade or wing and the erosion protective strips, are elastically absorbed and compensated without any danger that the bond will be destroyed. Thus by intentionally deviating from the present requirement in aircraft design, the adhesives employed need not be of high strength and relatively brittle, rather the adhesives are elastic with a comparable adhesion quality, a lower modulus of elasticity than the prior adhesives and a corresponding higher breaking strain (larger elongation at the breaking point of the adhesive).

The adhesive must moreover not absorb water because water entering into the adhesive bond from, for example, the humidity of the air would cause destruction of the bond, and can lead to delaminations, and perhaps in electrical systems a short-circuit.

Additionally, the adhesive must be resistant to peeling and vibration. High resistance to peeling exists when the strength of the bond formed by the adhesive between the surface of the profiled portion and the part to be connected together is approximately the same as the strength of the adhesive per se. The elasticity of the adhesive must be such that the energy imparted to the adhesive by those particles which strike the erosion protective strip is directed to a larger area than the immediate impact zone, where it is absorbed. It has been found that the above-mentioned malfunctions observed during test flights appeared most frequently during rain, which leads to the conclusion that the raindrops which strike the erosion protective strips with high energy may have led to localized failure of the adhesive bond and thus to localized separation of the erosion protective strips.

A further requirement is that the bonding characteristics in the operating temperature range of approximately between −60°C and +150°C are constant.

Referring now to the drawing, which is presented to illustrate an exemplary arrangement in which a heating mat and protective cover are bonded to a profiled section of an aircraft, there is shown a profiled portion 10 of an aircraft which may be a wing or helicopter rotor blade. A heating or deicing mat 12 is bonded to the surface of the profiled portion 10 by an adhesive 14, while a protective strip 16 is bonded to the mat 12 also by an adhesive 14. The adhesive 14 is an elastic adhesive which preferably has the characteristics mentioned above, namely, it does not absorb water, has a relatively high breaking strength, a low modulus of elasticity, and a high resistance to peeling, shear and vibration. Adhesives which meet these requirements in a particularly favorable manner are the known silicone adhesives. Examples of silicone adhesives which may be utilized are silicone rubber RTV 560 manufactured by GENERAL ELECTRIC COMPANY, USA, and some equivalent types developed by WACKER CHEMIE, Germany.

The silicone must be mixed with a certain percentage of curing agent before it is applied to the hardware to be bonded. Within the given potting time, the curing temperature depends on the type of the selected silicone rubber and will, for example, lie in the range of from normal room temperature up to 200° C.

A very important consideration is to prepare the surface of the hardware before application of the adhesives with a primer e.g. a liquid silicone resin.

The properties of the adhesive depend generally on the chosen type of silicone rubber.

The ranges of some properties of the preferred silicone rubber adhesives which are available are as follows:

shear strenght 20 kp/cm$^2$ — approximately 80 kp/cm$^2$
peel strenght 20 – 80
modulus of elasticity 8 – 100 kp/cm$^2$
elongation 120 – 400 percent.

A particular advantage in using an elastic adhesive results when long lengths of surfaces are to be bonded in that the elastic adhesive will yield thereby transferring some of the load from the initial loading points to all of the other points of the adhesive so that finally the stress is uniformly absorbed by the entire adhesion surface. This is quite unlike the case where a very rigid and not very elastic adhesive is used because in this latter case only relatively few points or areas actually come to bear the load (similarly to the known occurrence in a screw thread where only a few turns of the thread absorb the strain).

Moreover, since silicone adhesives exhibit only slight shrinkage, no special material stresses are developed in the adhesive due to shrinkage. Also, due to the high elasticity of the adhesive the adhesive layers can be made relatively thin without the developed stresses exceeding the bond limits. With the use of electrical heating mats, the thin layers produce the additional advantage of better heat transmission from the heating mats to the erosion protective strips.

The thickness selected for the bonding layer depends on the stresses which can be expected to occur between, for example, the outer surface (erosion protective strip) and the aircraft structure under the high bending and torsional deflection conditions experienced by the wing or rotor blade structure. The thickness of the layer might be 0.8 mm and even under low stresses it can drop down to 0.1 mm.

When attaching the erosion protective strips in connection with an electrical deicing system another advantage of the proposed silicone adhesives is that it is possible to add heat-conductive fillers to the adhesive so that favorable heat conduction values can be obtained.

As a filling compound, iron oxide can be used. The thermal conductivity of this material is 0.18 Btu ft/h ft$^2$ °F thermal units, ft = feet, $h$ = hours, and °F = °Fahrenheit. Without any filler the thermal conductivity of the adhesives is 0.36.

it will be understood that the above description of the present invention is susceptible to various modifications, changes and adaptations, and the same are intended to be comprehended within the meaning and range of equivalents of the appended claims.

We claim:

1. In the combination including a profiled portion of an aircraft and a protective cover joined by an adhesive to the profiled portion, the improvement wherein said adhesive is a hydrophobic elastic adhesive with a high breaking strain capacity, a low modulus of elasticity, and, a high resistance to peeling and fatique caused by vibration.

2. The combination as defined in claim 1 wherein said adhesive is a silicone adhesive.

3. The combination as defined in claim 1 wherein the profiled portions are helicopter rotor blades.

4. The combination as defined in claim 1 wherein the cover is an erosion protective strip.

5. The combination as defined in claim 4, further including an electrical heating mat disposed between said protective strip and said profiled portion and joined thereto by said adhesive.

6. The combination as defined in claim 5 wherein said adhesive is a silicone adhesive.

7. The combination as defined in claim 6, further including heat conductive fillers mixed with said adhesive.

8. In a method of fastening an erosion protective cover to a profiled portion of an aircraft by means of an adhesive, the improvement comprising using a hydrophobic elastic adhesive, which has a high breaking strain capacity, a low modulus of elasticity, a high resistance to peeling and shear and good vibration characteristics, for fastening the protective cover.

9. The combination as defined in claim 1, wherein the shear strength has a preferable range of 20 kp/cm² – approximately 80 kp/cm², the modulus of elasticity has a preferable range of 8 – 100 kp/cm², the resistance to peeling has a preferable range of 20 – 80, and the elongation at the breaking point has a preferable range of 120 – 400 percent.

10. The combination as defined in claim 4 wherein: said profiled portion is the leading edge of a helicopter rotor blade, and said adhesive is a silicone adhesive.

* * * * *